United States Patent [19]

Webb

[11] 4,340,263
[45] Jul. 20, 1982

[54] MACHINE FOR CHILLING DRINKING GLASSES

[76] Inventor: Lloyd E. Webb, P.O. Box 361, Florence, Oreg. 97439

[21] Appl. No.: 13,182

[22] Filed: Feb. 21, 1979

[51] Int. Cl.³ .................. A47B 49/00; A47B 77/16
[52] U.S. Cl. ............................ 312/266; 312/268; 312/134; 312/97.1
[58] Field of Search ........... 312/266, 267, 268, 134, 312/91, 97, 97.1

[56] References Cited

U.S. PATENT DOCUMENTS

| | | | |
|---|---|---|---|
| 962,933 | 6/1910 | Wallace | 312/134 |
| 1,030,376 | 6/1912 | Baecker | 312/134 |
| 1,697,306 | 1/1929 | Cutler | 312/97.1 |
| 2,592,038 | 4/1952 | Kimsey | 312/134 |
| 2,856,254 | 10/1958 | Paulos et al. | 312/266 |
| 2,857,230 | 10/1958 | Soldat | 312/266 |
| 2,976,099 | 3/1961 | Morrison | 312/267 |
| 3,186,783 | 6/1965 | Graber | 312/268 |
| 3,192,935 | 7/1965 | Hanifan | 312/267 |

FOREIGN PATENT DOCUMENTS

| | | | |
|---|---|---|---|
| 523159 | 3/1956 | Canada | 312/268 |
| 614283 | 12/1960 | Italy | 312/266 |
| 881466 | 11/1961 | United Kingdom | 312/97.1 |

Primary Examiner—Victor N. Sakran
Attorney, Agent, or Firm—James D. Givnan, Jr.

[57] ABSTRACT

A machine including a cabinet having a refrigerated interior for cooling drinking glasses carried on a circular frame. The frame is provided with a series of drinking glass supports which may pivot to retain horizontal disposition during frame rotation. To prevent tipping of the glass carrying supports, a roller chain circuit engages a sprocket on each support. A motor drive for the circular frame is provided as is a latch arrangement for locking the frame against rotary movement during glass loading and unloading.

4 Claims, 5 Drawing Figures

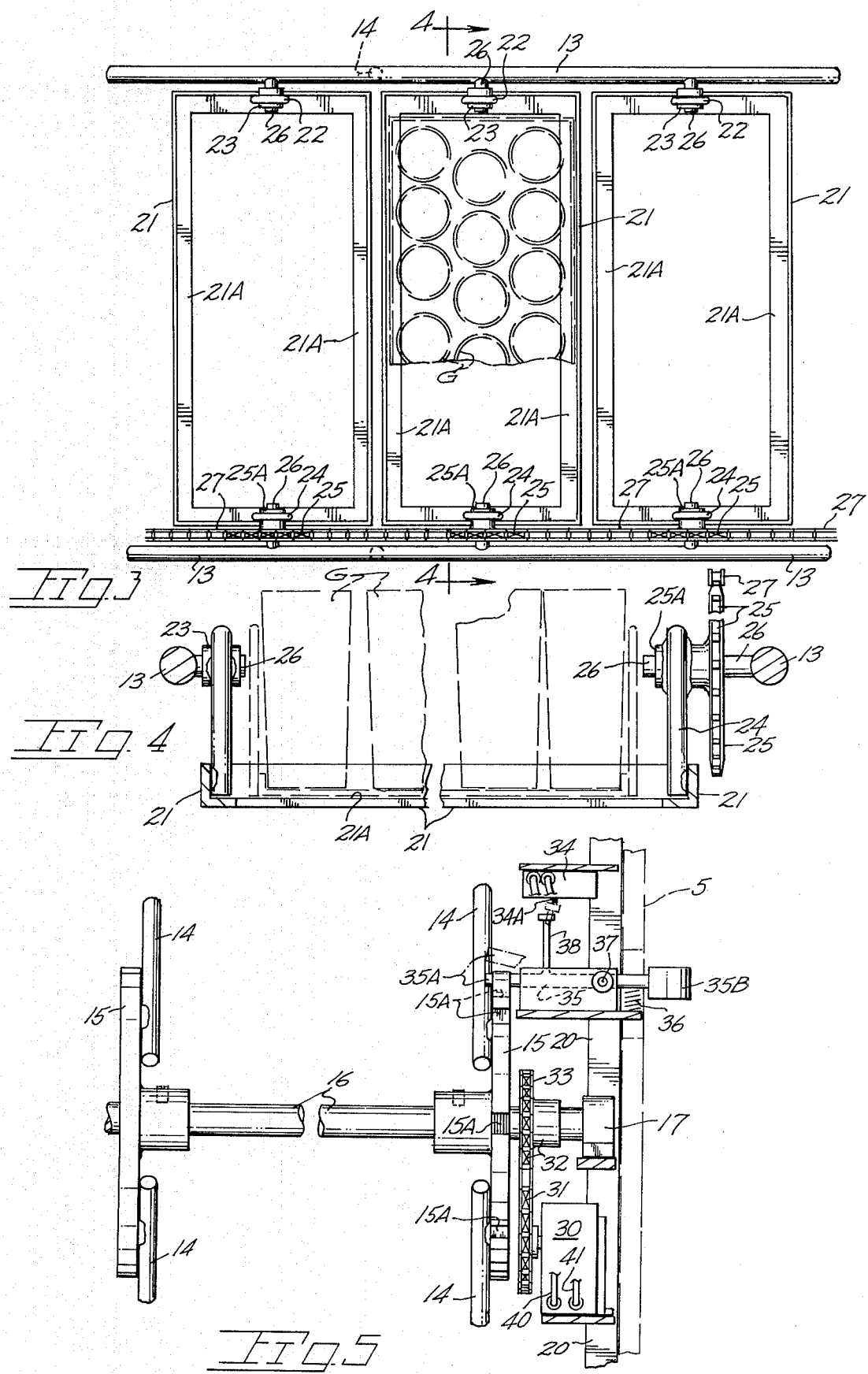

MACHINE FOR CHILLING DRINKING GLASSES

BACKGROUND OF THE INVENTION

The present invention pertains generally to machines for conveying articles in a circular upright path while said articles are being treated.

In restaurants and bars a large volume of drinking glasses must be washed, dried and preferably chilled prior to each use. The last step of chilling glasses before use normally entails the loading and unloading of glass filled trays from the shelves of a refrigerated cooler. The task of loading and unloading glasses from cooler shelves is both time consuming and arduous. Common practice entails loading a cooler at one door and retrieving the trays of cooled glasses at a remote door. The trays must be advanced along each shelf before a new tray may be added. The continual opening of two cooler doors results in wasteful operation of the cooler's refrigeration apparatus.

SUMMARY OF THE INVENTION

The present invention is embodied in a compact machine for cooling drinking glasses wherein the glasses, still on trays from a glass washing machine, are placed on an upright circular frame for travel in a circular path without risk of tray tipping.

The machine includes a frame from which a series of tray supports depend in a pivoted manner. Accordingly, the pivotally depending supports may at all times remain horizontal regardless of one or more of the supports being unevenly loaded. A continuous flexible member, shown as a roller chain, extends about the frame and is in rolling engagement with a sprocket secured to each of said supports. Any tendency of a support to tip, as for example by reason of a tray being unevenly loaded, is counteracted by the roller chain and the sprockets associated with each of the remaining supports. Without provision being made for arresting such tipping, an assymmetrically loaded support may pivot to an inclined position spilling the glasses thereon.

Important objects of the present invention include the provision of a machine having a series of supports for glasses or other articles whereon each support is constrained for travel in a circular path while maintaining a horizontal disposition; a machine wherein pivotal supports are circumferentially spaced about a circular frame with continuous means interconnecting the supports to prevent tipping of an unevenly loaded support; the provision of a machine having a series of supports each pivotally mounted on a rotatable, circular frame with continuous means interconnecting each of the supports to confine the same against tipping movement.

BRIEF DESCRIPTION OF THE DRAWING

In the accompanying drawing:

FIG. 3 is a plan view taken downwardly along line 3—3 of FIG. 2;

FIG. 4 is a sectional view of a typical support taken along line 4—4 of FIG. 3; and FIG. 5 is a sectional view taken along line 5—5 of FIG. 2 of the drive system and latch means for indexing the rotatable frame into loading/unloading position.

DETAILED DESCRIPTION OF THE PREFERRED EMBODIMENT

Figure 1:
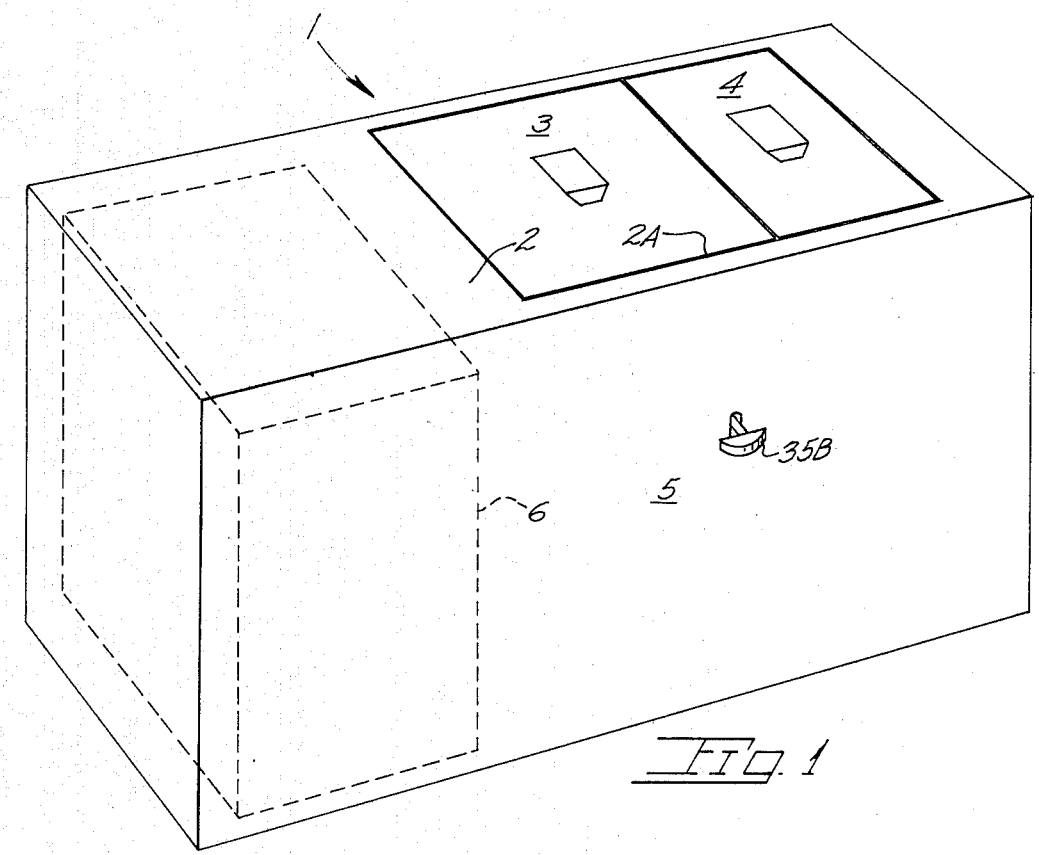
FIG. 1 is a perspective view of the machine embodying the present invention.
Figure 2:
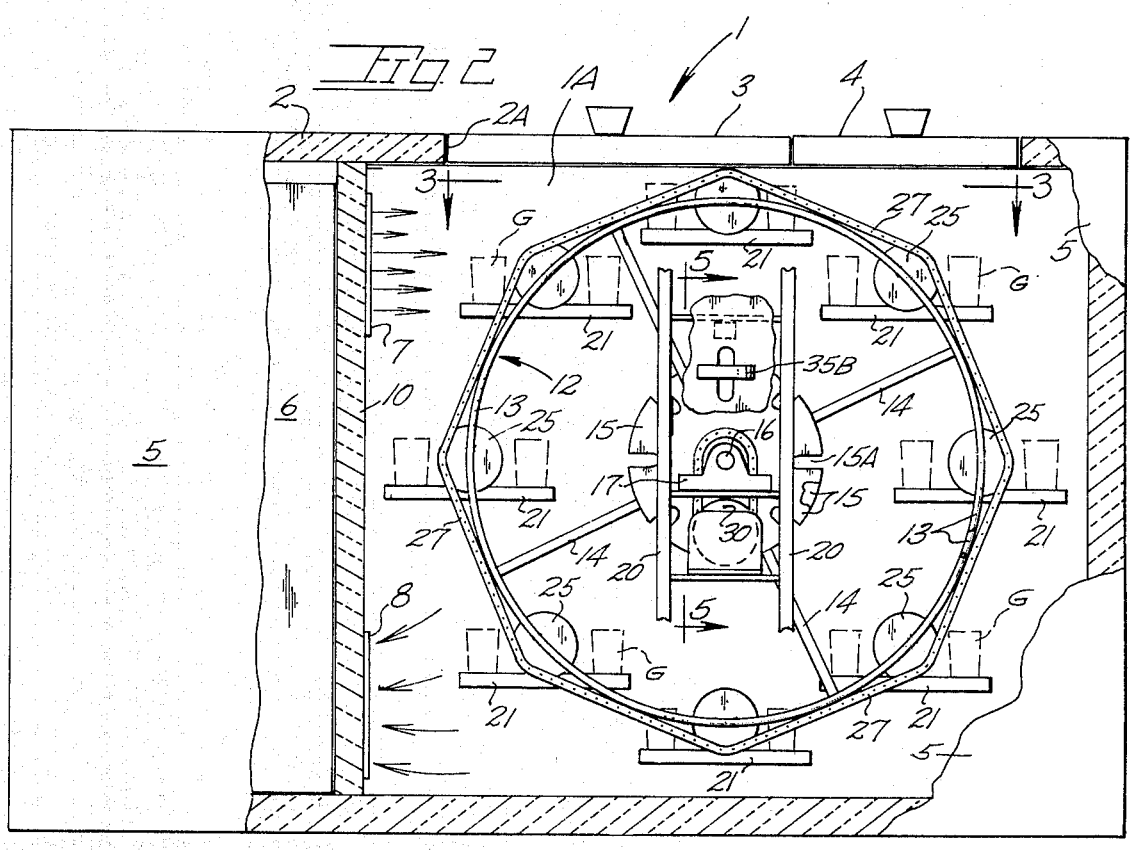
FIG. 2 is a front elevational view of the machine with a front wall broken away for purposes of illustration.

With continuing attention to the drawing, the reference numeral 1 indicates generally the cabinet housing the present invention which is presently utilized for chilling drinking glasses. Other embodiments and uses of the invention will become apparent to those skilled in the art for the treating of other articles.

The cabinet includes a top wall 2 defining an access opening 2A normally closed by closures 3 and 4. A front wall is indicated at 5. In the present embodiment the cabinet above described is constructed so as to insulate the cabinet interior.

A refrigeration unit at 6 circulates a cooled airflow through cabinet interior 1A via exhaust and intake vents 7 and 8 in a cabinet partition 10. Suitable thermostatic controls regulate the unit and the temperature of the cabinet interior.

A circular frame, generally at 12, includes a pair of rings 13 supported by spokes 14 in turn carried by hubs 15 circular frame members or secured adjacent opposite ends of shaft 16. Each shaft end is journalled within a pillow block bearing 17 supported by a cabinet interior framework 20.

The circular frame 12 includes a series of supports 21 extending intermediate the pair of circular frame rings 13 and on which are placed the glasses being chilled. Preferably, supports 21 are of a length and width to receive glass bearing trays also used to carry the glasses G during automatic washing and drying operations to avoid additional unloading and loading of the glasses. Supports 21, best shown in FIGS. 3 and 4, are of angle construction with a tray supporting inner flange 21A. At one end of each support is a hanger 22 provided with a bearing 23 while the remaining support end is equipped with a hanger 24 within the upper end of which is secured, as by a weld, the hub 25A of sprocket means 25. Pairs of inwardly directed spindles 26 spaced about the frame rings are received within bearings 23 and sprocket hubs 25A. Accordingly, each support may rotate relative the rings 13 and about the aligned axes of a pair of spindles.

The supports 21 and particularly the sprocket 25 associated therewith are interconnected via continuous flexible member 27. As each support depends from the ring mounted spindles 26 the same would normally have a tendency to tip or oscilate about the spindle axes during intermittent frame rotation. Such oscillation is prevented by continuous member 27 as same moves only progressively during frame movement.

A drive for circular frame 12 includes a motor 30 including a speed reduction drive having a one RPM output in place on a cabinet structural component. Driving and driven sprockets 31 and 32 with a roller chain 33 serve to impart rotation to shaft 16 of the circular frame. A motor electrical source includes a normally open switch 34 in a motor circuit including leads 40-41.

Latch means for indexing motor driven frame 12 into position for unloading and loading of glass filled trays is embodied within latch 35 spring biased at 36 for rocking motion about a pivot 37. The inner end 35A of the latch rides on the periphery of a hub 15 during frame movement and is biased downwardly into engagement with a hub defined slot 15A to retain the frame against movement. An arm 38 on said latch extends upwardly for upward switch closing contact with a switch control button 34A to close a motor circuit. Downward movement of spring biased latch 35 into the next hub recess results in opening of the motor circuit. Subsequent motor operation for partial rotation of frame 12 is initiated by depressing the exposed latch end at 35B causing closure of the motor circuit through switch 34 which circuit stays closed until frame rotation permits latch end 35A to be biased into the next hub recess.

In use, water glasses or other articles being treated are loaded onto supports 21 through cabinet opening 2A whereafter the cabinet is closed. The refrigeration unit 6 operates automatically in response to thermostatic controls to reduce the temperature of cabinet interior 1A for chilling of the glasses. As earlier noted, supports 21 are preferably of a size and shape to receive glass filled trays directly from a washing and drying machine. Loading and unloading of the machine entails incremental rotation of circular frame 12 by momentary actuation of latch handle 35B. Circular frame 12 automatically stops to sequentially position the supports at the top of the frame immediately below the cabinet opening. The operator need not be concerned with whether or not the glasses are evenly distributed on the support as would be the case were means not provided to inhibit tipping of each support. Further, starting and stopping of circular frame 12 may be abrupt as the supports 21 are secured against tipping by continuous element 13.

While I have shown but one embodiment of the invention it will be apparent to those skilled in the art that the invention may be embodied still otherwise departing from the spirit and scope of the invention.

Having thus described the invention, what is desired to be secured under a Letters Patent is:

I claim:

1. In a machine having a circular frame rotatably supported for travel about a horizontal axis, a series of horizontally disposed load receiving supports pivotally depending from points spaced about said circular frame, said supports adapted to receive articles, the improvement comprising, a continuous flexible member spaced outwardly from the circular frame.

sprocket means fixed to each of said supports in movable engagement with and supporting said flexible member, said sprocket means and said supports rotatable relative the circular frame during frame rotation, and said continuous flexible member interconnecting each of said sprocket means of each of said supports with one another whereby all of said supports are maintained in a horizontal position regardless of some of said supports being assymmetrically loaded relative the supports center of gravity.

2. The machine claimed in claim 1 wherein said continuous flexible member is a roller chain and said means comprises a sprocket secured to each support.

3. A machine for conveying articles in a circular upright path, said machine comprising, a cabinet, a circular frame rotatably mounted within said cabinet for rotation about a horizontal axis, a series of horizontally disposed supports pivotally depending from said frame at spaced apart points thereabout for reception of the articles, a continuous flexible member of a shape generally corresponding to the shape of said frame but disposed in an outwardly spaced manner therefrom, means integral with each of said supports and engaging said flexible member at points therealong, said means and said supports movable relative to said frame during frame rotation so as to permit the supports to be horizontal at all times, and said flexible member serving to interconnect said supports to prevent undesired tipping of same from the horizontal during frame rotation.

4. The machine claimed in claim 3 wherein said frame includes a shaft, hubs on said shaft, spokes integral with said hub, circular frame members carried by spokes, one of said hubs defining recesses spaced thereabout, latch means on said cabinet engageable with said one hub to index the frame and the supports thereon at loading and unloading positions, said latch means including an arm manually positionable into momentary abutment with switch means on the machine to close a circuit to an electric motor in driving engagement with said circular frame, the circuit to the motor being interrupted when said arm is repositioned within one of said hub recesses.

* * * * *